UNITED STATES PATENT OFFICE.

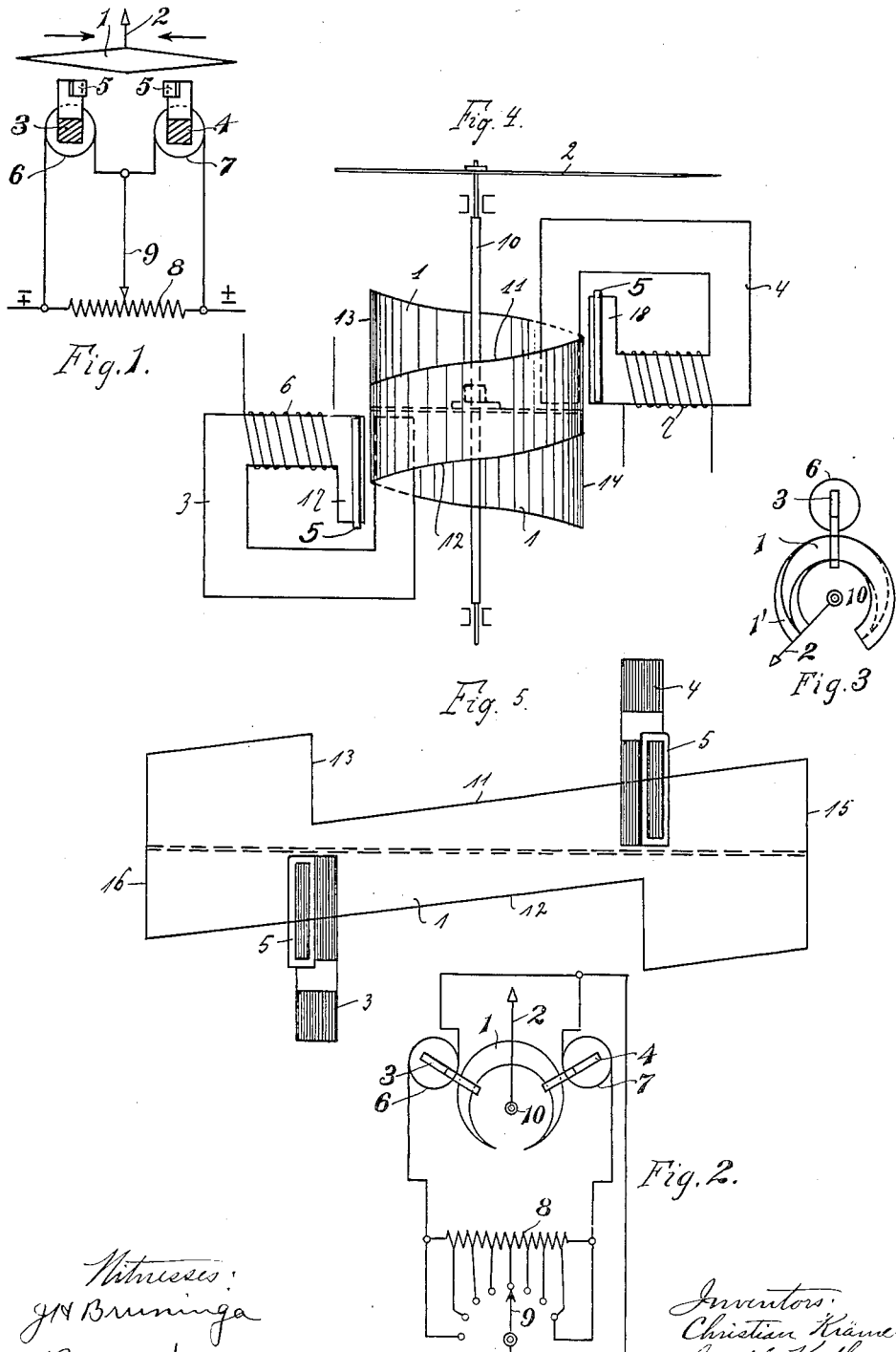

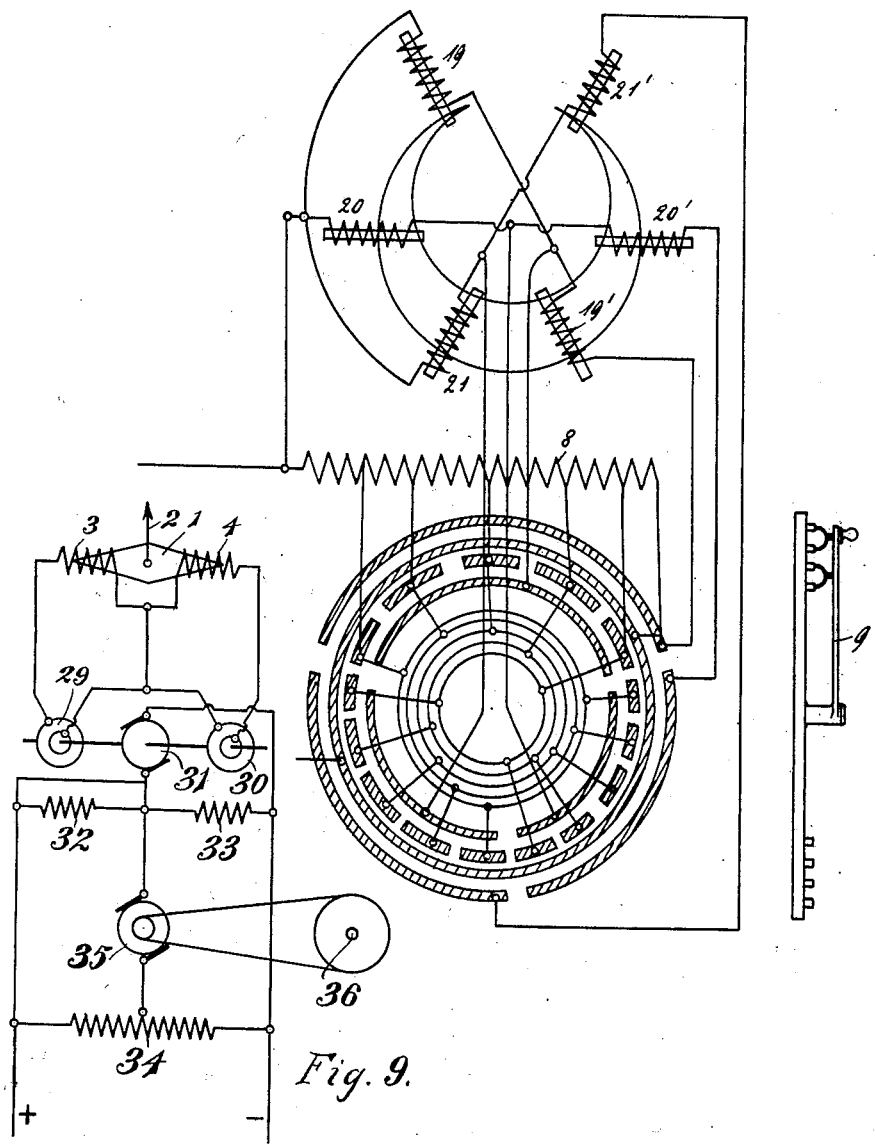

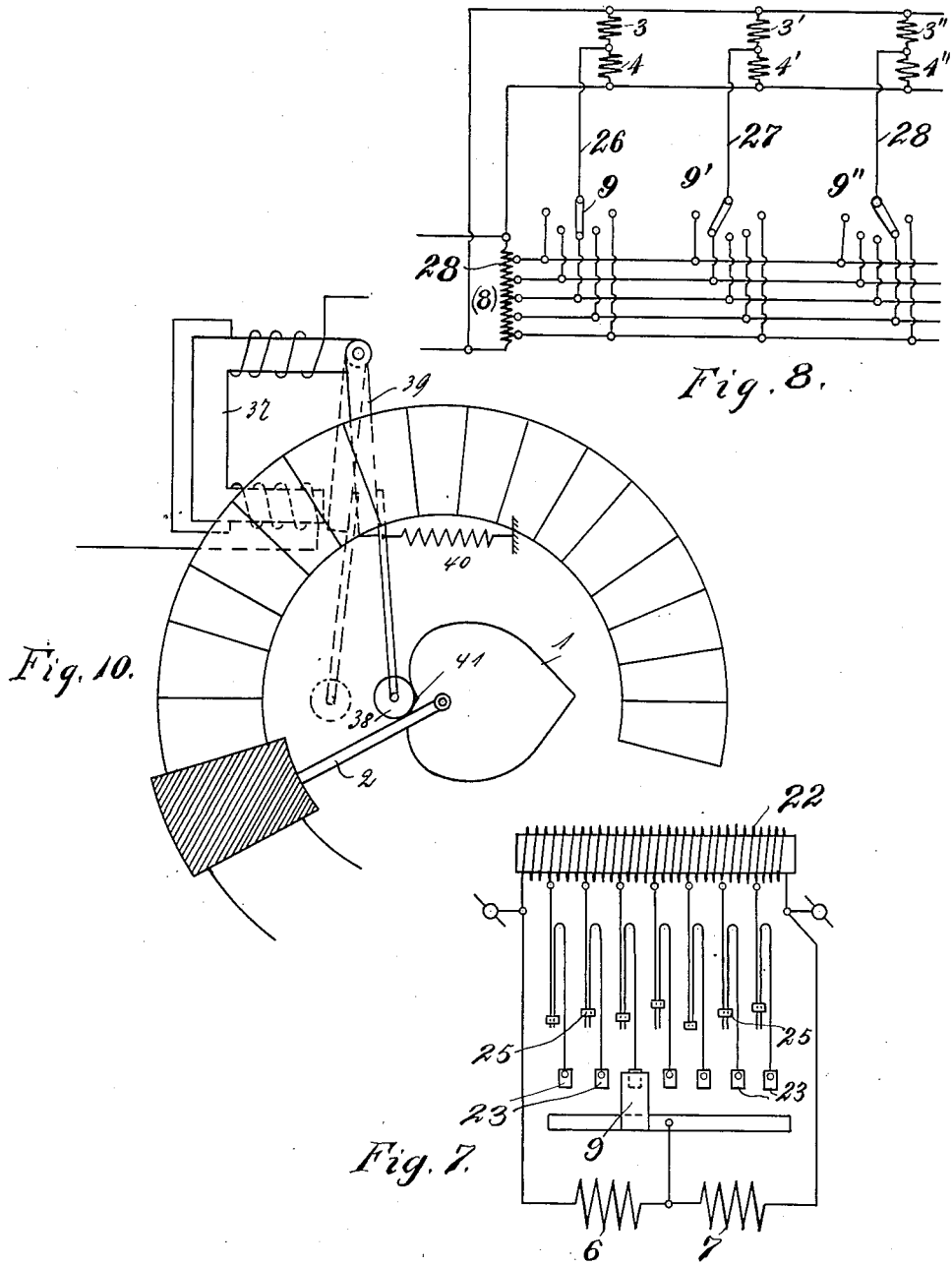

CHRISTIAN KRÄMER AND JOSEPH KRELL, OF FRANKFORT-ON-THE-MAIN, GERMANY, ASSIGNORS, BY MESNE ASSIGNMENTS, TO GENERAL ELECTRIC COMPANY, A CORPORATION OF NEW YORK.

ALTERNATING-CURRENT INDICATOR.

1,128,008.   Specification of Letters Patent.   Patented Feb. 9, 1915.

Application filed July 12, 1909. Serial No. 507,175.

*To all whom it may concern:*

Be it known that we, CHRISTIAN KRÄMER and JOSEPH KRELL, subjects of the German Emperor, and residents of Frankfort-on-the-Main, Germany, have invented certain new and useful Improvements in Alternating-Current Indicators, of which the following is a specification.

This invention relates to improvements in alternating current indicators for transmitting orders, for indicating the results of measuring instruments, the positions of certain elements of a machine, or of a rudder, and the like. And the object of the improvements is to provide an apparatus of this class which is particularly simple in construction and reliable in operation. For this purpose an apparatus is provided in which by means of alternating current electromagnets or the like forces are exerted on a movable body of particular construction which is in connection with the indicating apparatus, and which is so constructed, that the forces exerted by the electromagnets are a function of the position of the body.

Our present invention is an improvement on the invention covered by our German Patent No. 206,689, granted February 8, 1909. For the purpose, therefore, of explaining our present invention we have illustrated in the accompanying drawings the invention covered by our said German patent, and have also shown several examples embodying our improvements.

In said drawings Figures 1 to 3 are diagrammatic views of indicators in which the movable body acted upon by the electromagnet is constructed in the form of a flat disk as disclosed in our German patent above referred to. Fig. 4 is a view showing an indicator embodying our improvements in which the movable body is constructed in the form of a cylinder. Fig. 5, is a plan showing a development of the movable body shown in Fig. 4 and in connection therewith the electromagnets, Fig. 6, is a diagrammatical view of an indicating system in which a plurality of pairs of electromagnets are arranged to successively act on the movable body, Fig. 7, is a diagrammatical view of an indicator system of the character shown in Fig. 6, in which additional resistances are provided to avoid short-circuits, Fig. 8, is a diagrammatical view of a system in which a plurality of receivers are connected in shunt to a common circuit, Fig. 9, is a diagrammatical view of a system designed for measuring the speed of a rotary shaft, and Fig. 10, is a diagrammatical view of a system in which means are provided for moving the indicator into a zero position.

Referring first to Fig. 1 for the purpose of explaining the general nature of the device upon which our present invention is an improvement it will be seen that we provide a movable body 1 of double conical form, carrying a pointer or indicator 2. The movable body is preferably constructed of highly conducting material, such as copper or aluminum, and is arranged in inductive relation to the poles of a pair of alternating current electromagnets 3 and 4. Each of such pole pieces is partly surrounded by a short-circuiting coil or band 5 of copper or the like, whereby the magnetism of the portion of the pole piece so surrounded is caused to lag behind that of the unsurrounded portion, at each pulsation of the current. This is a construction which has been applied in the so-called retardation induction motor and a magnet constructed as described is commonly said to be provided with "shaded" pole pieces. It is obvious that, owing to the retardation effect of the short circuiting coil or band, a traveling or shifting field will be produced by each current wave, such field acting inductively upon the movable body of conducting material and tending to displace the same in the direction of one of the arrows shown. The electromagnets are so wound as to operate in opposite directions. The electromagnetic windings of the magnets 3 and 4 are respectively numbered 6 and 7. At one of their ends they are connected with each other, while at their opposite ends they are connected with a regulating auto-transformer 8. The joint of both coils is connected to a movable contact 9 of the auto-transformer 8. By shifting the contact 9 the voltage supplied to the coils 6 and 7 can be varied. In the position of the parts shown the voltage supplied to the coils 6 and 7 is the same. The symmetrical body 1 is located centrally between both electromagnets, and as both electromagnets act on the same with the same force, but in opposite directions, the body 1 and the pointer 2 remain stationary. If, however, the voltage supplied to the coils 6 and 7 is varied, for example by increasing the voltage supplied to the coil 6 and thereby decreasing that supplied to the coil 7, the force exerted by the electromagnet 3 is greater than that exerted by the electromagnet 4. Thereby the body 1 is moved toward the electromagnet 4. Thereby the mass of the body 1 exposed to the action of the electromagnet 3 is decreased, while the mass exposed to the electromagnet 4 is increased. Therefore the equilibrium of the forces exerted on the body 1 will be restituted again, so that a certain distribution of the voltage of the electromagnets corresponds to a certain position of the body 1 and the pointer 2.

In the example shown in Fig. 2 the rectilinear displacement of the body 1 is substituted by a rotary motion. For this purpose, the said body is made in the form of a sickle, and it has a rocking support on a shaft 10 which, as shown, also carries the pointer 2.

In the example shown in Fig. 3 two bodies 1 and 1' constructed in the form of a sickle are located one above the other, and they have a rocking support on a shaft 10. The pointed ends of the said bodies are so located relatively to each other, that upon rotation of the system the mass exposed to its electromagnet by one of the bodies is increased, while that of the other one is decreased, and vice versa. In this case the electromagnets are located one above the other. This construction is preferable, because, other conditions being the same, the displacement of the pointer is greater than in the examples illustrated in Figs. 1 and 2. If the system is used on board of a ship or the like, in which contact points having the same potential as the poles of the transformer are otherwise provided near the indicating system, only one additional conductor, namely the conductor connected to the movable contact 9 is required for transmitting any desired number of indications.

In the example described with reference to Figs. 1 to 3 the masses are disposed within a plane, or, where a displacement of the pointer of more than 180° is required, within two planes. This disposition of the masses, however, is objectionable, because the receiver the essential part of which is formed by the movable body 1 requires a broad and high construction, and because the said body, the masses of which are located at a considerable distance from their center of gravitation, has a considerable inertia, so that the instrument answers but slowly to the impulses transmitted thereto.

Referring now to Fig. 4 showing our improvements over the arrangements shown in Figs. 1–3, in which the disadvantages above referred to are avoided, the body 1 for moving the pointer is not constructed as a flat body disposed in a plane but has a hollow and substantially cylindrical rotary body. When thus constructing the body 1 the distance of the masses from their centers of gravitation is decreased so that the inertia is decreased accordingly. Referring to the said figure, the body 1 of substantially cylindrical construction is mounted on a vertical rotary shaft carrying at its upper end the pointer 2.

The development of the cylindrical body is shown in Fig. 5. In the said development the edges 11, 12, and 13, 14 correspond to the helices 11, and 12, and to the edges 13 and 14. If the developed figure is bent together, so that its edges 15 and 16 meet, the cylindrical body 1 shown in Fig. 4 is produced, which when rotated passes with wedge shaped portions along the poles 17 and 18 of the electromagnets 3 and 4, so that the forces exerted by the electromagnets are a function of the position of the body 1. Evidently, if the masses are disposed in a different way, the construction of the rotary body is varied accordingly, and if the magnets are disposed in a different way, a rotary body of a different construction is necessary.

In indicators of the construction shown in Figs. 1 to 5, the indicating area of the body 1 is comparatively small, because the differences of the masses of the movable body 1 within the field of action of the magnets must have a certain value in order to produce a certain action when under the action of the electromagnets. In order not to be bound to this limit in the indicating area of the body 1 the system may be varied as shown in Fig. 6. As shown the body to be shifted, i. e. the sickle shaped disk 1, is located within the field of action of a plurality of pairs of electromagnets adapted to be successively energized. The said electromagnets are so disposed relatively to the shiftable body 1, that the latter when it has arrived at the end of the field of action of the first electromagnet has a position relatively to the second pair of electromagnets which corresponds to the initial position of the first electromagnet. In the example shown three pairs of coils 19, 19', 20, 20' and 21, 21' are provided which are connected with one of their ends to the poles of a transformer 8, and with their other ends to a suitable controller 9.

In constructing the instrument described considerable difficulty arises from the fact, that the homogeneity of the material and other electrical conditions are never the same even in apparatus which are otherwise of the same construction. It is therefore necessary after constructing an apparatus to adjust the same by varying the distribution of the mass of the body 1 at different places. This, however causes much trouble, because it is necessary after each test to dismount the shiftable body 1, and because it is exceedingly difficult to remove the exact amount of material. To dispense with this troublesome method the following method of adjusting the apparatus can be used: The transmitters of the distance indicators are preferably provided with a reactive coil for producing the different voltages to be supplied to the alternating current electromagnets. In the connection of two adjacent contacts of the series of contacts with the corresponding points of the reactive coil an element of high specific resistance must be included, so that in case of a short-circuit between the said contacts caused by the removal of the resistance of the reactive coil interposed between the same the intensity of the current is not too high. This is effected in the manner usual in sectional transformers and the like by constructing the movable contact with two points and interposing between the said points a resistance of appropriate height, so that, if both points are located on a contact, a resistance of the appropriate height is interposed between the points of the reactive coil. In the arrangement shown in Fig. 7 the said additional resistance is not connected to the sliding contact, but it is included in the connection between the series of stationary contacts and the associated points of the reactive coil, and it is so arranged, that the value of this resistance can be varied. Now when giving a signal, the sliding contact must be on a certain stationary contact, and therefore a particular one of the said additional resistances is included in the circuit. Therefore by properly varying the said resistance the voltage which is active at the receiver can be varied.

In the example shown in Fig. 7, 22 indicates the reactive coil included in the circuit, which acts in the same way as the transformer shown in Figs. 1, 2 and 6, and which is used for operating the receiver 6, 7, or a plurality of the same. The stationary contacts 23 are connected with the points 24 of the reactive coil 22. This connection is made by means of wires of high resistance, so that in case of a short-circuit of two contact plates 23 by means of the contact slide 9 a strong current can not be set up. As the said resistances are also included in the transmitting circuit, and can be varied for example by means of slides 25, the said resistances may also be used for adjusting purposes. The resistances may also be used in a different way. However, in any case they must also be included in the circuit between the transmitter and the receiver. Other means for varying the values of the resistances may be provided. Under certain circumstances such means may entirely be dispensed with, for example, if, when mounting and adjusting the apparatus, the length of the resistance wires is determined, and the wires are at once finally fixed. As said before, in the transmitter of the indicators of the class described preferably a reactive coil is used for producing the voltage required for the alternating current electromagnets. If now several transmitters are required, for example if numbers of several ciphers and orders are simultaneously to be transmitted, a special transmitter is necessary for the units, the tens, the hundreds, and for the orders. In such a transmitter the reactive coil is very troublesome and it requires much space, which is objectionable in many cases, for example in order telegraphs in turrets of men of war. To avoid this disadvantage, the system may be so arranged, that a single reactive coil is used for all the transmitters. For example in the indicators illustrated in Figs. 1 to 3, from the two electromagnets of a receiver to be supplied with alternating currents of different voltages a balancing conductor passing over contacts is branched off which is connected to the reactive coil, and the said electromagnets, and also the electromagnets of the other receivers, are connected in shunt to the circuit, and all the contacts of the different transmitters corresponding to the same position of the pointer are connected to the same points of the reactive coil.

The ohmic resistance of the reactive coil is small, while the number of its windings is large, and it is so constructed, that its reaction remains almost constant, though the magnetizing current is varied. If now all the transmitter levers, the number of which may be for example four, are placed on the same contact, instead of the four sections of the reactive coil a single one is used. However, as the decrease of the voltage, by reason of the inductive resistance, depends on that caused by the ohmic resistance and that caused by induction, and as the conditions at the coils can easily be so arranged that even in case of comparatively large variations of the magnetizing current a constant field of forces is set up, in case of a small ohmic resistance the hypotenuses of the voltage diagrams indicating the voltages do not considerably differ from each other, if instead of the normal current a current of four times its strength passes through the coil. By experiments made with the system this has proved to be correct. To illustrate this part of the invention more clearly a system embodying the same has been shown in Fig. 8. In the said example three receivers are provided each of which comprises electromagnets 3, 4, 3', 4' and 3″, 4″ which are connected in shunt to the circuit. By balancing conductors 26, 27 and 28 passing over contacts 9, 9′ and 9″ the said electromagnets are connected to the reactive coil 8 (or 22). The contacts of the transmitters which correspond to the same displacement of the pointer are connected to the same point of the reactive coil.

The indicators described with reference to Figs. 1 to 4 are particularly adapted for use in connection with those known apparatuses which consist of small electrical generators driven by shafts or other rotating elements in order to measure the number of revolutions of the latter. Thereby the measurements made by the said apparatus are made more accurate. As the system is under electric tension, and only the difference of the voltage is active, the measuring generator can be constructed for smaller voltages. This is particularly of importance in ships, where the conductors pass through rooms in which the temperatures are subjected to considerable variations, whereby the voltage is considerably decreased on account of the variations of the resistance of the conductors. The alternating current electromagnets which generate the opposite forces for shifting the indicating devices, are supplied with energy from two alternating current generators rotating at the same speed, the fields of which generators are so energized, from the same electric circuit as the small measuring generators, that according to the speed of the measuring instrument and its direction of rotation a different voltage is set up in the exciting coils. An example of such a device is illustrated in Fig. 9. In the said example, 3 and 4 are the alternating current electromagnets. The voltage is produced by two alternating current generators 29 and 30 rotated by a motor 31 which as shown is likewise supplied with current from the circuit. The change of the voltage of the said alternating current machines is effected by means of the field windings 32 and 33. The latter are connected, through a resistance 34, to any desired circuit. Between the middle of the said resistance and the middle of the exciting coils 32 and 33 the measuring generator 35 is included in a bridge, and the said generator is driven by the shaft 36 the number of revolutions of which is to be measured.

The operation of the measuring device is as follows: If current is supplied to the system while the measuring generator 35 is stationary, the fields of the alternating current generators are equally energized from the circuit, and they supply current of the same voltage. Therefore the forces exerted on the indicator in opposite directions are the same, so that the latter is not shifted. If now the measuring dynamo 35 is rotated by the shaft 36, it generates an electromotive force which corresponds to the number of revolutions of the same and to the direction of rotation. If the current caused by the said electromotive force flows for example in the direction of the arrows, the excitation of the coil 33 is increased, and that of the coil 32 is decreased. Thereby the voltage of the alternating current generators 29 and 30 is changed, whereby the difference of the voltage required for actuating the receiver is set up. A considerable advantage of the arrangement resides in the fact, that large variations of the voltage of the circuit do not interfere with the operation and the accuracy of the measurements.

The indicators described have no zero position in the sense as is used in other apparatus of this or a similar character. The pointer stops in the position to which it has been shifted by the transmission of the last order, and it does not alter its position unless a new order is transmitted. If by some reason the apparatus or the conductor is rendered inoperative, the apparatus does not indicate this disturbance. Therefore, means are preferably provided, whereby the pointer is moved into a zero position in case the apparatus should be out of order. However, in order to indicate, whether the pointer has been moved backward by intentionally switching the receiver out, or by some disorder of the system, the force used for moving the pointer or the indicator backward is locked by an electric controlling current as long as the system is in good order.

As the apparatus is always supplied with current while the system is in operation, the said controlling current can easily be branched off from a suitable part of the circuit. In the example shown in Fig. 10 the said controlling current excites an electromagnet 37 which, against the action of a spring 40, holds an armature 39 carrying a roller 38. If by some disorder of the circuit the controlling current is broken, the spring 40 moves the shiftable body (in the example shown a cam disk 1) by means of the roller 38, until the latter arrives within the notch 41. The cam 1 carries the pointer 2, so that the latter is shifted into a predetermined position by the action of the spring 40, if the controlling circuit is broken. The zero position of the pointer may either be indicated by a sign, by covering the pointer by an opaque plate, or in a similar way.

Claims:

1. An alternating current indicator comprising a pair of electromagnets each provided with means for causing a shifting field in the pole piece thereof, a movable cylindrical conducting body disposed in inductive relation with both of said magnets including means whereby the resultant force exerted by said magnets upon said body is caused to be a function of the position of said body.

2. An alternating current indicator comprising a pair of electromagnets each provided with means for causing a shifting field in the polepieces thereof, a movable cylindrical conducting body disposed in inductive relation to the polepiece of both of said magnets, and means for varying the relative amount of current supplied to each magnet whereby said body is caused to assume different positions.

3. An alternating current indicator comprising a pair of electromagnets each having a shaded polepiece, a movable cylindrical conducting body disposed in inductive relation to the polepieces of both of said magnets including means whereby the resultant force exerted by said magnets upon said body is caused to be a function of the position of said body, and means for varying the amount of current supplied to each magnet whereby the body is caused to assume different positions.

4. An alternating current indicator comprising a pair of electromagnets each having a shaded polepiece and a movable cylindrical conducting body disposed in inductive relation to both of said members including means whereby the resultant force exerted by said members upon said body is caused to be a function of the position of said body.

5. An alternating current indicator comprising a receiving device including a pair of electromagnets each having a shaded polepiece, a movable cylindrical conducting body in inductive relation to both of said magnets including means whereby the resultant force exerted by said magnets upon the said member is a function of the position of said member, a transmitting device including a transformer connected to said magnets, and a transmitting member arranged to vary the voltage impressed upon said magnets.

6. An alternating current indicator comprising a pair of electromagnets each having a shaded polepiece, a movable cylindrical conducting body disposed in inductive relation to the polepieces of both of said magnets, means for supplying alternating current simultaneously to the windings of both of said magnets, and means for varying the relative amount of current supplied to each magnet whereby said body is caused to assume different positions.

7. An alternating current indicator comprising a pair of electromagnets each having a shaded polepiece, a movable cylindrical conducting body disposed in inductive relation to the polepieces of both of said magnets, an autotransformer having two secondary circuits each connected to the winding of one of said magnets, and means for changing the connections of said transformer in such a manner as to vary the relative voltage impressed upon said winding.

8. An alternating current indicator comprising a pair of electromagnets each provided with means for causing a shifting field in the polepiece thereof, a movable cylindrical conducting body disposed in inductive relation to the polepieces of both of said magnets, means for supplying alternating current simultaneously to the windings of both of said magnets, and means for varying the relative amount of current supplied to each magnet whereby said body is caused to assume different positions.

9. An alternating current indicator comprising a pair of electromagnets, a movable body disposed in inductive relation to both of said magnets, an autotransformer having two secondary circuits each connected to the windings of one of said magnets, and means for changing the connections of said transformer in such a manner as to vary the relative voltages impressed upon said winding, said means comprising a movable arm included in the secondary circuit, and a series of contact plates coöperating therewith so that consecutive plates will be bridged thereby, each of said contact plates being connected with a point of the transformer winding through a conductor having a high resistance whereby short circuiting of the transformer section is prevented.

10. An alternating current indicator comprising a pair of electromagnets, a movable body disposed in inductive relation to both of said magnets, an autotransformer having two secondary circuits each connected to the winding of one of said magnets, means for changing the connections of said transformer in such manner as to vary the relative voltage impressed upon said winding, said means comprising a movable arm included in the secondary circuits, and a series of contact plates coöperating therewith each of said contact plates being connected with a point of the transformer winding through a conductor having a high resistance, and means for adjusting the resistance of each of said conductors.

In testimony whereof we have signed our names to this specification in the presence of two subscribing witnesses.

CHRISTIAN KRÄMER.
JOSEPH KRELL.

Witnesses:
ERNEST H. L. MUMMENHOFF,
OTTO W. HELLMRICH.